United States Patent
Poisner

(10) Patent No.: US 7,817,769 B2
(45) Date of Patent: Oct. 19, 2010

(54) REAL TIME CLOCK RATE CHECKER AND RECOVERY MECHANISM

(75) Inventor: David I Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 960 days.

(21) Appl. No.: 11/642,138

(22) Filed: Dec. 18, 2006

(65) Prior Publication Data

US 2008/0143415 A1    Jun. 19, 2008

(51) Int. Cl.
H03D 3/24 (2006.01)
H04L 7/00 (2006.01)
H04L 25/00 (2006.01)
H04L 25/40 (2006.01)
H03L 7/00 (2006.01)

(52) U.S. Cl. .................. 375/376; 375/354; 375/371; 375/373; 327/141

(58) Field of Classification Search .................. 327/141; 370/503; 375/376, 373, 371, 354; 358/409–424; 709/248; 713/375–601
See application file for complete search history.

(56) References Cited

U.S. PATENT DOCUMENTS

| 6,911,872 | B2 | 6/2005 | Shah et al. | |
|---|---|---|---|---|
| 7,184,936 | B1* | 2/2007 | Bhandari | 702/189 |
| 2004/0189359 | A1* | 9/2004 | Shah et al. | 327/158 |
| 2004/0189405 | A1* | 9/2004 | Shah et al. | 331/57 |
| 2006/0244543 | A1* | 11/2006 | Meltzer | 331/57 |
| 2007/0124604 | A1* | 5/2007 | Feldstein et al. | 713/300 |
| 2009/0233592 | A1* | 9/2009 | Stepanian | 455/419 |

* cited by examiner

*Primary Examiner*—David C Payne
*Assistant Examiner*—Erin M File
(74) *Attorney, Agent, or Firm*—Derek J. Reynolds

(57) ABSTRACT

A circuit, method, and system are disclosed. In one embodiment the circuit comprises a ring oscillator circuit having a plurality of delay elements, the ring oscillator circuit to generate a clock signal frequency, a checker circuit to compare a count of clock signal oscillations observed per complete loop of the ring oscillator circuit to a reference count, and to set a flag signal if the clock signal oscillation count is above a high threshold amount or below a low threshold amount.

10 Claims, 3 Drawing Sheets

US 7,817,769 B2

REAL TIME CLOCK RATE CHECKER AND RECOVERY MECHANISM

FIELD OF THE INVENTION

The invention relates to ring oscillator circuits.

BACKGROUND OF THE INVENTION

Tunable ring oscillator circuits are utilized in a number of computer systems for clock multiplication. Many chipsets sold by Intel® Corporation implement these ring oscillator circuits to maintain accurate clock signal multiplication. In many of these implementations, the real time clock (generally 32.768 kHz) is multiplied to 1 MHz. The 1 MHz clock is then used to run circuits within the computer system, such as the System Management Bus (SMBus) controller. The real time clock may continue to operate when the computer system's main clock generator has shut down because a battery is utilized to power the real time clock. This enables the platform to accurately track time even when it appears to be off.

There are cases where the real time clock may fail. This can be caused by too much capacitance on the real time clock piezoelectric crystal (such as if a human touches the crystal), a conductive path across the crystal leads (due to condensation), or voltage fluctuations in the analog oscillator. These cases have been observed in real systems. Additionally, the real time clock may increase in speed when the operating voltage unexpectedly increases and the real time clock may decrease in speed if the temperature in the system increases. Furthermore, there are also cases where the oscillator that outputs the real time clock may work intermittently or the oscillator may get stuck on a certain harmonic. Thus, there are many instances where the real time clock can unexpectedly fail or change in speed. In the past, this has required changes to hardware implementations to correct these problems.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a circuit, method, and system for a real time clock rate checker and recovery mechanism are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
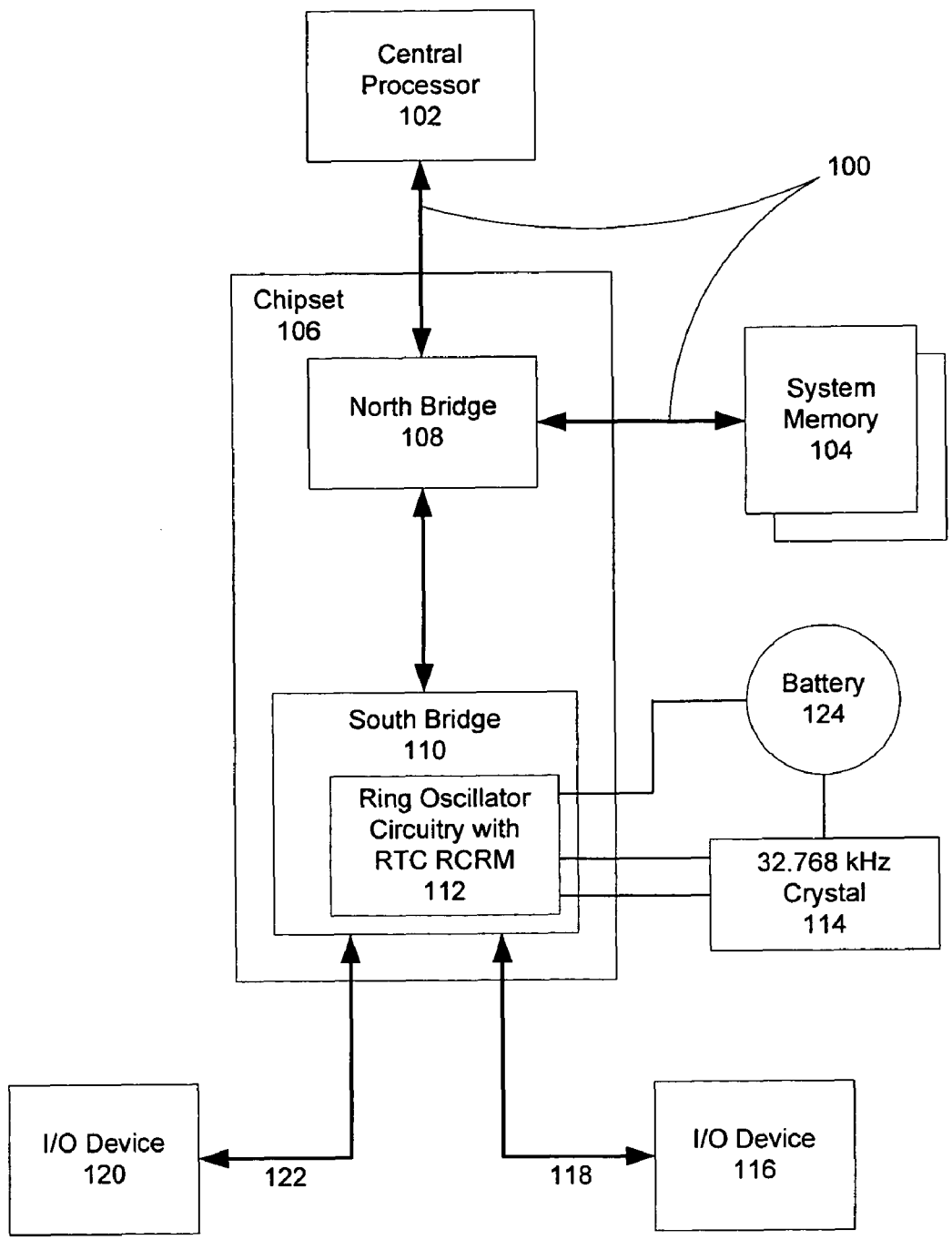
FIG. 1 describes one embodiment of a computer system implementing a real time clock rate checker and recovery mechanism.

FIG. 1 describes one embodiment of a computer system implementing a real time clock rate checker and recovery mechanism. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100. In another embodiment, there are multiple central processors coupled to processor-memory interconnect (multiple processors are not shown in this figure).

Processor-memory interconnect 100 provides the central processor 102 and other devices access to the system memory 104. A system memory controller controls access to the system memory 104. In different embodiments, the system memory controller may be located within the north bridge 108 of chipset 106 or on the same chip as central processor 102 (the memory controller is not shown). Information, instructions, and other data may be stored in system memory 104 for use by central processor 102 as well as many other potential devices.

Input/Output (I/O) devices, such as I/O devices 116 and 120, are coupled to the south bridge 110 of the chipset 106 through one or more I/O interconnects (118 and 122 respectively). In one embodiment, the system is located within a handheld device and I/O device 116 is a keypad. In another embodiment, the system is a personal computer system and I/O interconnect 122 is a Universal Serial Bus (USB) interconnect. In another embodiment, the system is located within a television and I/O device 120 is a television signal decoder. In another embodiment, this system may be incorporated within an automobile. The south bridge is sometimes referred to as an I/O Controller Hub (ICH). In multiple embodiments, a ring oscillator circuit is located within the south bridge. The ring oscillator circuit is coupled to a piezoelectric crystal 114. In one embodiment, the crystal is a 32.768 kHz crystal. In other embodiments, the ring oscillator circuit is coupled to a crystal of a different frequency. Generally, the crystal is soldered to the motherboard in the computer system. Furthermore, in many embodiments, the crystal 114 and at least a clock oscillation circuit located within the ring oscillator circuit are coupled to a battery 124 so the real-time clock can still be generated when the computer system is unpowered or in a low power state. In another embodiment, the crystal 114 and at least a clock oscillation circuit located within the ring oscillator circuit are coupled to a large capacitor that maintains an electric charge over a significant period of time so the real-time clock can still be generated when the computer system is unpowered or in a low power state. In one embodiment, the ring oscillator circuitry also includes a Real Time Clock Rate Checker and Recovery Mechanism (RTC RCRM) circuit 112. The RTC RCRM checks whether the real time clock in the system has malfunctioned and, if so, allows for the system to recover with an alternative clock.

Figure 2:
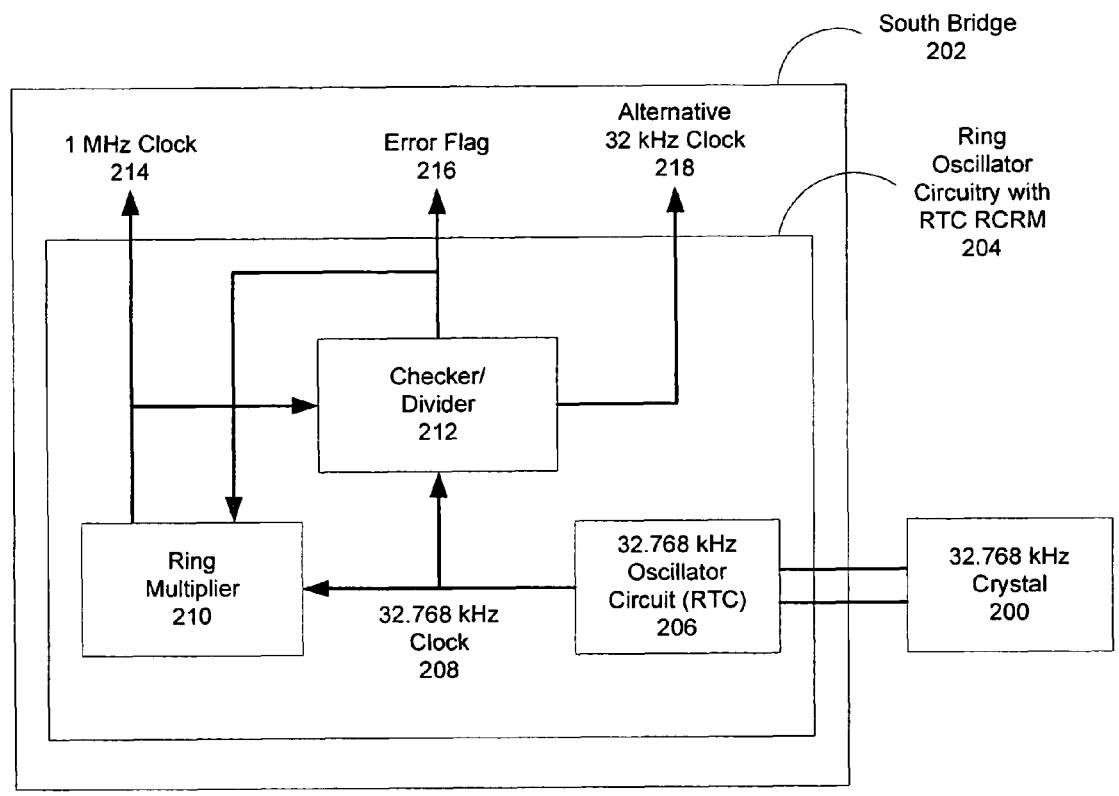
FIG. 2 illustrates one embodiment of the real time clock rate checker and recovery mechanism circuit.

FIG. 2 illustrates one embodiment of the real time clock rate checker and recovery mechanism circuit. In this embodiment, a 32.768 kHz crystal 200 is coupled to the south bridge 202 of a computer system. More specifically, the crystal is coupled to a 32.768 kHz oscillator circuit 206 within the ring oscillator circuitry that includes the RTC RCRM 204.

The 32.768 kHz oscillator circuit 206 inputs the frequency wave of the crystal and outputs a 32.768 kHz clock 208 to any circuitry within the computer system that requires a real-time clock. The signal output from an oscillator circuit in clock circuitry is commonly referred to as the real-time clock or as the reference signal when discussing ring oscillators specifically. In one embodiment, the computer system requires that the 32.768 kHz clock 208 be multiplied by a ring multiplier 210 to create a more usable 1 MHz clock 214. The ring multiplier has a number of delay elements arranged in a ring to create a precision 1 MHz clock 214. The ring multiplier 210 can multiply the 32.768 kHz clock 208 by any specified amount. In this case, the ring multiplier 210 is multiplying the 32.768 kHz clock 208 by 32 to create the 1 MHz clock 214. Note that the 1 MHz clock 214 is actually 1.049 MHz. In one embodiment, the delay elements are a series of inverters. The accuracy of the 1 MHz clock 214 is achievable due to the large number of extremely small delay inverters, which allows for fine-tuning of the final 1 MHz clock output from the ring multiplier 210.

When the output clock is predetermined to be a specific frequency, in this case 1 MHz, the ring multiplier 210 can adapt to some change in the input clock to maintain the output clock frequency. For example, if the input clock decreases by 5% for some reason, the ring multiplier can decrease the number of inverters in the ring to maintain the number of oscillations required per loop to output a constant 1 MHz frequency. Though, there are limits to the compensation for an inaccurate input clock. In one embodiment, the limit to the change in the input clock (the real time clock) that the ring multiplier can compensate for is 2/3 to 4/3 of the desired input clock frequency. In one embodiment, each time the clock signal inverts (changes from a high to low—logical one to logical zero—or from low to high—logical zero to logical one) it is counted as an oscillation. In other embodiments, an oscillation is only counted when the clock signal changes from high to low or from low to high, but not in both directions.

In one embodiment, a checker/divider circuit 212 receives as input the 32.768 kHz clock 208 from the 32.768 kHz oscillator circuit 206 and the 1 MHz clock 214 from the ring multiplier 210. The checker/divider circuit 212 can then count the number of oscillations of the signal through each complete loop in the ring multiplier 210 per input real time clock. In the embodiment where the 32.768 kHz clock signal is being used, the checker/divider circuit 212 should see 32 oscillations, which means the signal should go through 32 inverters per loop to create the 1 MHz clock output 214. In one embodiment a high and low threshold value is predetermined and set. In one embodiment, the low threshold value is 2/3 of the desired oscillations and the high threshold value is 4/3 of the desired oscillations. In other embodiments, the threshold values can be any number greater or lower than the desired number of oscillations per loop that the ring multiplier can compensate for. Thus, if the ring multiplier can compensate for a ±50% variation, then the threshold values would be 1/2 or 3/2 of the desired number of oscillations.

Thus, in this embodiment, if the number of oscillations is not 32 and rather a significant enough number higher or lower than 32 to surpass either the high or low threshold values, then the 32.768 kHz oscillator circuit 206 (the real time clock circuit) is assumed to be working improperly. When this happens, the checker/divider circuit 212 will set a flag (error flag 216) to indicate a problem with the real time clock circuit. The error flag 216 is sent out to the system to notify any circuit, device, interrupt controller, basic input/output system (BIOS), operating system (OS), or software application that requires information as to whether the real time clock is accurate or not. Additionally, the error flag 216 is also returned to the ring multiplier 210.

When the ring multiplier 210 receives the error flag 216, it tunes the output clock 214 to a specific frequency. In one embodiment, the output clock is tuned to approximately 1 MHz by continuing to loop a signal around the chain of inverters at the last valid number of inverters at the high or low threshold amount. In this case, the checker/divider 212 is aware of the threshold number of oscillations and divides the approximated 1 MHz frequency signal by a predetermined value to recreate an alternate approximate version of the ~32 kHz clock. The checker/divider then outputs the alternative 32 kHz clock 218 to any circuit in the computer system requiring a real time clock for operation. The alternative clock 218 frequency does not have to be exactly 32.768 kHz, rather it just has to be close to 32.768 kHz to allow for most circuitry to remain operational, as some circuits will not operate without an input clock.

Figure 3:
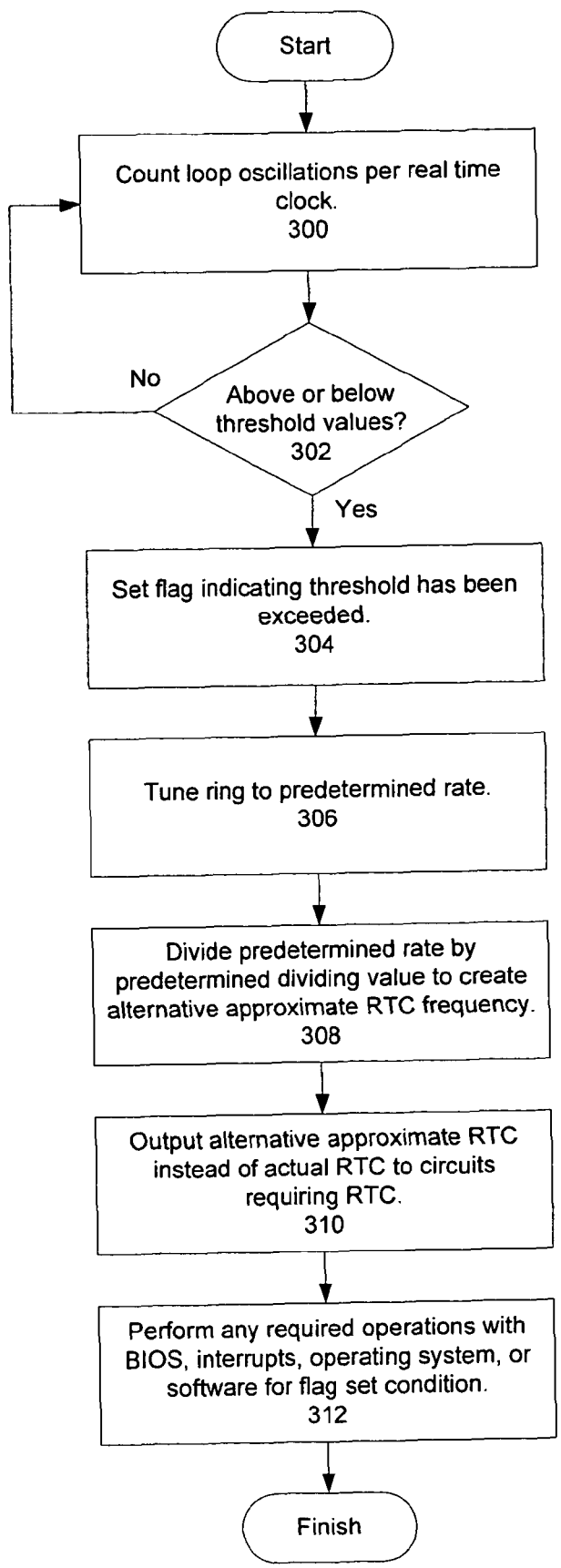
FIG. 3 illustrates one embodiment of a flow diagram describing a process to operate a real time clock checker and recovery mechanism.

FIG. 3 illustrates one embodiment of a flow diagram describing a process to operate a real time clock checker and recovery mechanism. The process is performed by processing logic that can be hardware, software, or a combination of both. The process begins by processing logic counting the number of oscillations of a clock signal propagating through a ring oscillation circuit (processing block 300). The processing logic counts the number of oscillations per real time clock tick. In one embodiment, the real time clock is generated by an oscillation circuit that receives as input a frequency wave from a 32.768 kHz crystal. Next, processing logic determines whether the oscillation count is above a high threshold value or below a low threshold value (processing block 302). In one embodiment, the high threshold value is 4/3 of the normal number of oscillations to multiply a 32.768 kHz to create a 1 MHz clock.

If the oscillation count is within the threshold boundary values, then the process returns to processing block 300 to count the loop oscillations again. Otherwise, if either the high or low threshold values have been exceeded, then processing logic sets an error flag indicating either the high or low threshold has been exceeded (processing block 304). Next, processing logic tunes the ring oscillator to a predetermined rate (processing block 306). In one embodiment, the predetermined rate is the same regardless of whether the high or low threshold has been exceeded. In other embodiments, the predetermined rate may be the rate at the high threshold if the high threshold has been exceeded, or the predetermined rate may be the rate at the low threshold if the low threshold has been exceeded.

Then processing logic divides the predetermined rate by a predetermined dividing value to create an alternative approximate real time clock signal with a frequency at or near the working frequency of the actual real time clock (processing block 308). Next, processing logic outputs the alternative approximate real time clock instead of the actual real time clock to circuits requiring the real time clock because the original real time clock has malfunctioned (processing block 310).

Finally, processing logic performs any required operations with the BIOS, interrupts, operating system, or software for the flag set condition (processing block 312). In one embodiment, the flag is readable by the BIOS in the computer system. During the system boot, the BIOS can read this flag to determine if the real time clock is running properly. In one embodiment, if the real time clock is not running properly, the BIOS will not boot the operating system. In another embodiment, the BIOS prints a warning message on the screen to indicate that the system time may be incorrect because the real time clock is malfunctioning, thus the system overall may be prone to malfunctions. In another embodiment, the flag signal is provided to an AMT (Advanced Management Technology) subsystem transmit the flag signal to a remote monitoring agent.

If the system has already booted when the flag is set, an interrupt circuit (such as a system management interrupt or a system control interrupt) reads the flag signal and indicates the existence of the flag signal to either a software application, an operating system, or a BIOS. The software application, operating system, or BIOS can then take appropriate measures in response to the flag. In different embodiments, such measures include powering down the system, allowing the system to continue to operate with the alternative approximate real time clock signal, inform the computer user of the problem, etc. In one embodiment, after processing logic has implemented the alternative approximate real time clock, the original real time clock continues to be checked in processing blocks 300 and 302 to determine if the loop oscillation count has returned to an amount within the threshold range. In one embodiment, if the count has returned to an acceptable level, processing logic reinstates the original real time clock and outputs the original real time clock to circuits within the computer system that require the clock for operation.

Thus, embodiments of a method, system, and computer readable medium to implement quality of service priority level controls for platform resources are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A circuit, comprising:
    a ring oscillator circuit having a plurality of delay elements, the ring oscillator circuit to
        generate a clock signal frequency by multiplying a reference signal by a specified amount; and
        provide a clock at the generated clock signal frequency to one or more other circuits in a computer system;
    a checker circuit to compare a count of clock signal oscillations observed per complete loop of the ring oscillator circuit to a reference count, and to set a flag signal if the clock signal oscillation count is above a high threshold amount or below a low threshold amount, wherein if the flag signal is set, the ring oscillator to tune to a predetermined clock signal frequency;
    a divider circuit to
        divide the predetermined clock signal frequency by a predetermined amount to generate an alternate clock signal that approximates the reference signal frequency; and
        provide the alternate clock signal to one or more other circuits in a computer system that would otherwise receive the reference signal;
    wherein, if the alternate clock signal is provided, the checker circuit to recompare the loop count to the reference count at set time intervals to determine if the reference signal has resumed operation within the threshold amounts; and
    wherein, if the reference signal has resumed operation within the threshold amounts, the ring oscillator circuit to resume providing the reference signal to the one or more circuits in the system that were receiving the alternate clock signal.

2. The circuit of claim 1, wherein the checker circuit further comprises:
    a counter circuit to generate the clock signal oscillation count; and
    a flag circuit to set the flag signal if the clock signal oscillation count is above the high threshold or below the low threshold.

3. The circuit of claim 2, wherein each delay element comprises an inverter.

4. The circuit of claim 3, wherein the clock signal oscillation count increments each time the clock signal inverts as it travels around the ring oscillator circuit.

5. The circuit of claim 1, wherein the checker circuit provides the flag signal to one of an interrupt circuit, a software application, an operating system, and a basic input/output system (BIOS).

6. The circuit of claim 5, wherein the BIOS reads the flag signal during system initialization and refuses to boot the operating system.

7. The circuit of claim 5, wherein the interrupt circuit reads the flag signal and indicates the existence of the flag signal to one of a software application, an operating system, and a BIOS.

8. A method, comprising:
    generating a clock signal frequency by multiplying a reference signal by a specified amount using a ring oscillator;
    comparing a count of clock signal oscillations observed per complete loop of the ring oscillator to a reference count;
    setting a flag signal if the clock signal oscillation count is above a high threshold amount or below a low threshold amount;
    tuning the ring oscillator to generate a predetermined clock signal frequency when the flag signal is set;
    dividing the predetermined clock signal frequency by a predetermined amount to generate an alternate clock signal that approximates the reference signal frequency;
    providing the alternate clock signal to one or more other circuits in a computer system that would otherwise receive the reference signal;
    recomparing the loop count to the reference count at set time intervals to determine if the reference signal has resumed operation within the threshold amounts; and
    if the reference signal has resumed operation within the threshold amounts, providing the reference signal to the one or more circuits in the system that were receiving the alternate clock signal.

9. The method of claim 8, further comprising setting an interrupt in the computer system if the flag signal is set to inform a Basic Input/Output System (BIOS) located on the computer system that the reference signal is malfunctioning.

10. The method of claim 9, further comprising initiating a system shut down when the interrupt is set.

* * * * *